United States Patent [19]

Kanno

[11] Patent Number: 5,283,548

[45] Date of Patent: Feb. 1, 1994

[54] FUEL-FLOW ALARM

[75] Inventor: Isao Kanno, Hamamatsu, Japan

[73] Assignee: Sanshin Kogyo Kabushiki Kaisha, Shizuoka, Japan

[21] Appl. No.: 1,526

[22] Filed: Jan. 6, 1993

[30] Foreign Application Priority Data

Jan. 13, 1992 [JP] Japan .................................. 4-023209

[51] Int. Cl.$^5$ .............................................. B60Q 1/00
[52] U.S. Cl. .................................. 340/439; 340/451; 340/626; 123/198 D; 123/198 DB; 180/271
[58] Field of Search ............... 340/439, 438, 459, 441, 340/451, 522, 626, 669; 123/198 D, 198 DB, 196 S, 41.15; 180/271

[56] References Cited

U.S. PATENT DOCUMENTS

| | | | |
|---|---|---|---|
| 4,261,209 | 4/1981 | Hatsuno et al. | 340/451 |
| 4,413,248 | 11/1983 | Starzl | 340/459 |
| 4,870,392 | 9/1989 | Baltz et al. | |
| 4,899,706 | 2/1990 | Sasaki | 123/198 D |

Primary Examiner—John K. Peng
Assistant Examiner—Nina Tong
Attorney, Agent, or Firm—Bacon & Thomas

[57] ABSTRACT

A fuel-flow alarm includes a fuel-flow detector for detecting the volume of fuel flowing in a conduit connecting a fuel tank to an engine fuel supply device and provides a warning when the volume of fuel is either above or below predetermined limits. The fuel-flow alarm includes a setting unit used to pre-set fuel-flow limit values for various operational states of the engine, detectors which detect the operational status of the engine, a compensation unit for adjusting the pre-set fuel flow limit values in dependence upon the operational status of the engine and a comparator which compares the limit values outputted from the compensation unit with the actual, detected flow rate. When a determination is made that the fuel flow rate exceeds at least one permissible limit value, the alarm is activated.

20 Claims, 3 Drawing Sheets

FUEL-FLOW ALARM

BACKGROUND OF THE INVENTION

1. Field of the Invention

This invention pertains to a fuel-flow alarm adapted to provide a warning signal when a fuel flow rate through a conduit is outside a predetermined permissible range, such as when the conduit is obstructed.

2. Discussion of the Prior Art

It is known in the art to equip marine and other engines with fuel-flow alarms. These alarms provide an indication of abnormalities in the free-flow of fuel through a conduit such as when foreign matter in the fuel clogs the fuel line or a fuel filter, or when the fuel line becomes kinked or obstructed. Such known alarms function by detecting the reduced pressure inside the fuel line downstream of the fuel filter. When a reduced pressure exceeding a certain level is detected, an audible buzzer or a visual lamp provides a warning signal to an operator. Such prior art alarm arrangements are represented by U.S. Pat. No. 4,870,392.

In these known fuel-flow alarms, the fuel line reduced pressure warning is based on high-load engine operating conditions. The reason for this is that if the fuel line reduced pressure warning were based on low load or low RPM operating conditions, the reduced pressure setting would have to be a low one, and if that setting were used, high load or high RPM operations would exceed these normal limits and the alarm would sound when the fuel line was not actually obstructed. The high load operating premise was used, therefore, to avoid this contingency.

Because of the warning pressure setting problem noted above, the fuel-flow alarms of the prior art simply do not operate during low load or low RPM engine operating conditions. Instead, these fuel-flow alarms function only when the engine is operating under high load or high RPM conditions, and do not function at all under low load or low RPM operating conditions.

When used in small marine engines, for example, after trolling for a long period of time and subsequently operating the engine at full speed to return to harbor, such known alarms would not sound even if the fuel line was obstructed during the trolling operation. It would only sound during full speed engine operating conditions. If the alarm is activated and the operator was to ignore the warning and return to harbor at full speed, the engine could be damaged due to, for example, an excessively lean fuel charge caused by partial fuel shortage. Accordingly, the only alternative would be to return to harbor at a low speed.

SUMMARY OF THE INVENTION

This invention was developed after careful consideration of the above problem. It is an object of the present invention to provide a fuel flow alarm which functions not only under high loads or high RPM operating conditions, but also under low load, low RPM engine operating conditions.

In order to attain the above objective, the present invention provides a fuel-flow alarm including a fuel-flow detector for detecting the volume of fuel flowing in a conduit connecting a fuel tank to a device for supplying fuel to an engine. The alarm provides warnings based upon the sensed signals of the fuel-flow detector. The fuel-flow alarm includes a setting unit used to pre-set fuel-flow limit values for various operational states of the engine, detectors which detect the operational status of the engine and a comparator which compares the limit value output from the setting unit with output signals from the engine operational status detector. When a determination is made that the fuel-flow value exceeds the limit value, the alarm is activated.

According to the invention, the engine operating state detector enables ascertaining the operational state of the engine and the pre-set fuel-flow limit values, which correspond to that detected state, are then transmitted and compared with an actual fuel-flow value. When the actual fuel-flow exceeds the limit value, such as during abnormal operating conditions, the alarm is activated.

DETAILED DESCRIPTION OF A PREFERRED EMBODIMENT

Figure 1:
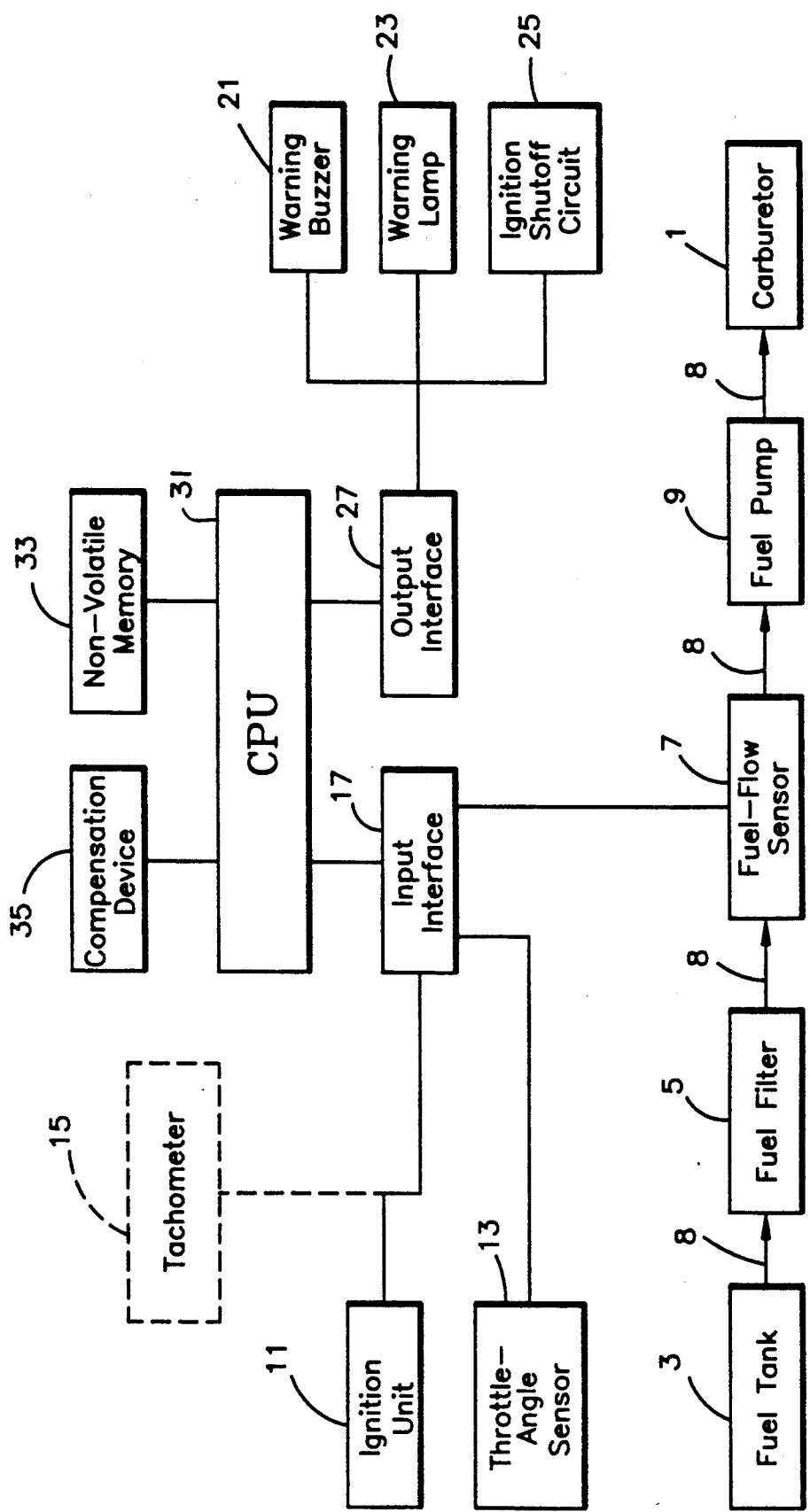
FIG. 1 is a block diagram of a fuel-flow alarm according to the present invention.

A preferred embodiment of the present invention will now be described with initial reference to FIG. 1 wherein a carburetor, connected to an engine charge intake passage (not shown), is indicated at 1 and is adapted to receive fuel from a fuel tank 3 through a filter 5 which filters out foreign matter that is mixed in with the fuel, a fuel-flow sensor 7 which measures, per unit time, the amount of fuel flowing through a fuel line 8, and a fuel pump 9. The fuel from fuel tank 3 flows in the direction of the arrows shown in FIG. 1 through the fuel line 8 and pump 9 to the carburetor 1, and consecutively passes through the fuel filter 5, the fuel-flow sensor 7, and the fuel pump 9 prior to entering the carburetor 1. The fuel, once inside carburetor 1, is adapted to move through the charge intake passage to at least one engine combustion chamber.

The fuel-flow sensor 7, positioned approximately midway in fuel line 8, detects the amount of fuel passing through fuel line 8. In the preferred embodiment, the fuel-flow sensor 7 comprises a paddle wheel type of sensor, but it should be understood that other means, such as a reduced pressure detector could also be used to detect the pressure differential on either side of the fuel filter 5. The fuel-flow sensor 7 is connected to a CPU (central processing unit) 31 through an input interface 17. This arrangement allows the detected flow value from the fuel-flow sensor 7 to be sent to CPU 31.

CPU 31 is also connected via the input interface 17 with an ignition unit 11 and a throttle-angle sensor 13. Ignition unit 11 detects engine RPM and sends this information to CPU 31. In the alternative, a tachometer 15, instead of the ignition unit 11, could be used to detect engine RPM. The throttle-angle sensor 13 detects the angle of the throttle (not shown) in carburetor 1. As should be recognized by one of ordinary skill in the art, the detected throttle angle is representative of engine load.

Figure 4:
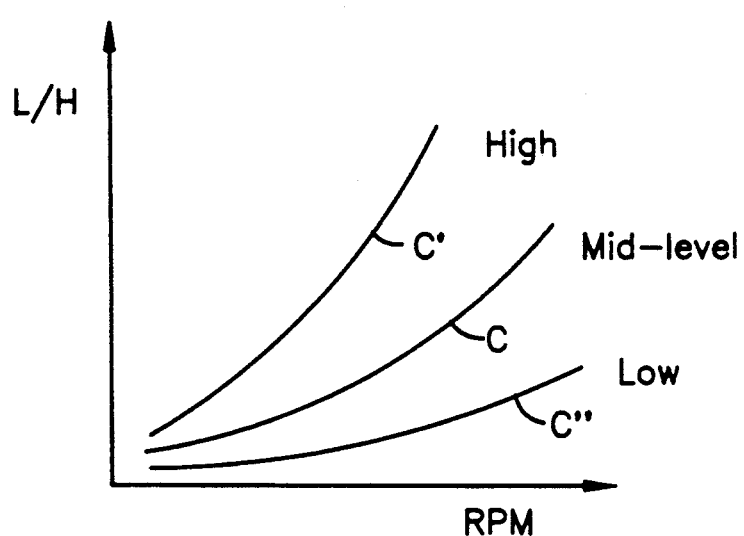
FIG. 4 is a graph showing the relationship between fuel-flow and RPM as a parameter of engine size.

CPU 31 is also connected with a read-only memory (ROM) 33 and a compensation device 35. ROM 33 stores fuel flow limit values L and H, where H is an upper limit and L is a lower limit corresponding to normal operating conditions, i.e. when the fuel filter is not clogged, along with preset throttle opening and engine RPM parameters. Compensation device 35 comprises a switching unit adapted to compensate for deviations from a standard characteristic C, i.e., an intermediate value curve between upper limit H and lower limit L values. In other words, by adjusting the compensation device 35, as indicated in FIG. 4, it is possible to raise the standard operating characteristic C upward to curve C' for large engines, and to lower it to curve C" for smaller engines. By using this method, it is possible to preset upper limits H and lower limits L for just one type of engine in ROM 33 and adjust these preset limits by means of compensation device 35 to adjust the actual upper limit H and lower limit L for a particular type of engine. This enables a relatively small memory capacity to be utilized with a large number of engines irrespective of their size.

Figure 2:
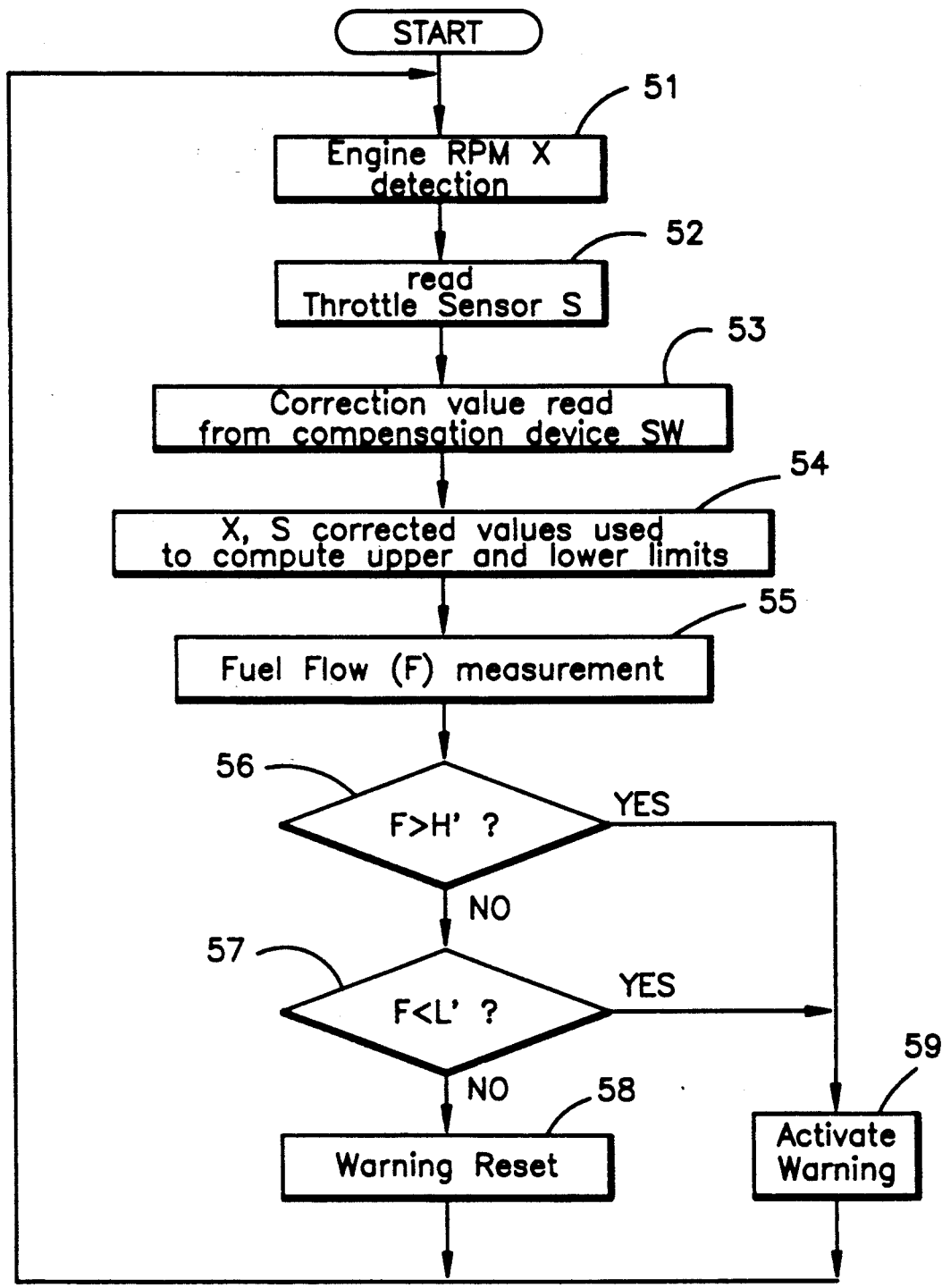
FIG. 2 is a flow chart showing an operating sequence of the fuel-flow alarm.
Figure 3:
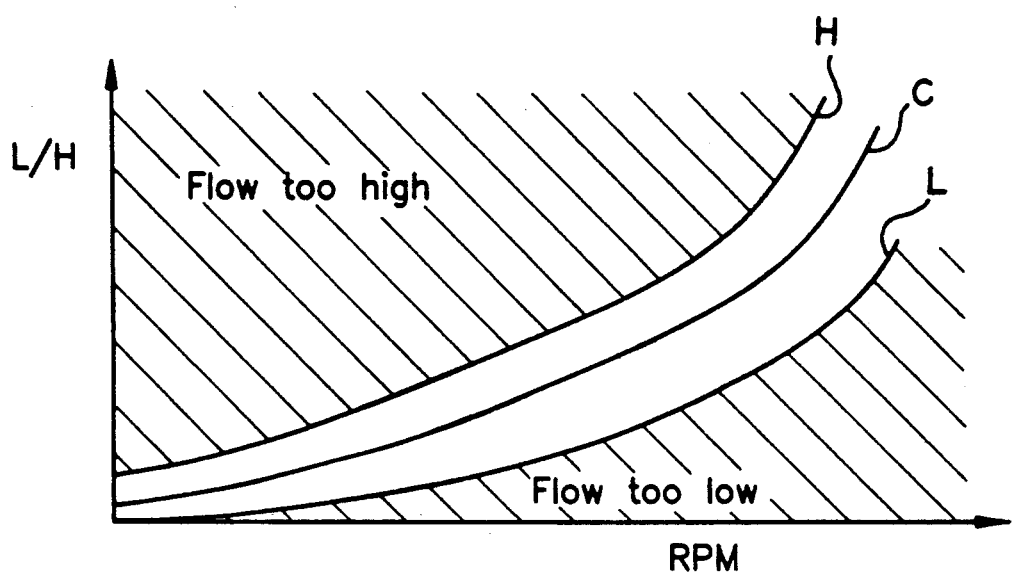
FIG. 3 is a graph showing the relationship between fuel-flow versus engine RPM.

CPU 31 is further connected via an output interface 27 to a warning buzzer 21, a warning lamp 23, and an ignition-shutoff circuit 25. The details of the operation of this arrangement are illustrated in the flow chart of FIG. 2 based on information provided to CPU 31 as will now be described in detail. First, ignition unit 11 or tachometer 15 detects the engine angular speed X, which is sent to CPU 31 (step 51). Next, throttle-angle sensor 13 detects the throttle opening S and sends this information to CPU 31 (step 52). Then, correction values from compensation device 35 are selected and fed to CPU 31 (step 53). Based on the sensed signals, values from ROM 33 are read in the CPU 31 and an upper limit value signal H and a lower limit value signal L are emitted. These limit values are corrected by the correction values from compensation device 35 to obtain adjusted upper and lower limits (step 54). Next, the fuel flow (i.e., volume per unit time) F is detected by fuel-flow sensor 7 and is fed to CPU 31 via input interface 17. This fuel-flow value F is continuously compared in the CPU 31 with the corrected upper limit H' (step 56). If the fuel flow value F exceeds the upper limit H', the alarm is activated (step 59). If the fuel flow valve F does not exceed the upper limit H', then there is an advance to the next step wherein the fuel flow value F is compared with the corrected lower limit L' (step 57). If the fuel flow value F is under the lower limit L', the alarm is activated (step 59). If the fuel flow value F is above the lower limit L', the alarm is not activated, the alarm is reset (step 58) and the flow returns to the START position.

When the fuel flow value F falls below the lower limit L', that is, when there is too little fuel flowing, the alarm is activated. This does not only occur during high load operating conditions as in the prior art warning devices. According to the present invention, the alarm can also be activated under low RPM, low load conditions. This is true since the low RPM, low load lower limit L can be called from ROM 33 and a comparison of the lower limit L' and the fuel flow value F will activate the warning appropriately even when operating under low RPM, low load conditions. In the preferred embodiment, compensation device 35 is utilized so that one set of upper and lower limit values can be provided for use with both large and small engines. Therefore, it is possible to perform these lower limit L correction computations on various types of engines irrespective of their size using a uniform read only memory specification.

On the other hand, when the fuel flow value F exceeds the upper limit H', i.e., when an excessive amount of fuel is flowing, the alarm is activated just as it is for a too low fuel flow value. As discussed above, in the warning devices of the prior art, the alarm could only be activated under high load/high RPM conditions but according to the present invention, the alarm can be activated under low load/low RPM conditions as well as under high load/high RPM conditions.

In the preferred embodiment, a warning buzzer 21, a warning lamp 23, and an ignition shutoff circuit 25 constitute the indicating portion of the alarm. Accordingly, the operator would be warned of a fuel flow abnormality by the audible warning buzzer 21 and the visible, preferably blinking, warning lamp 23. Additionally, the operation of the ignition shutoff circuit 25 causes the engine RPM to be held below certain levels so that, even if the operator should miss the warning buzzer 21 and/or the warning lamp 23, damage to the engine is prevented. Of course, the particular alarm units noted above could be used individually to either directly or indirectly warn the operator.

Figure 5:
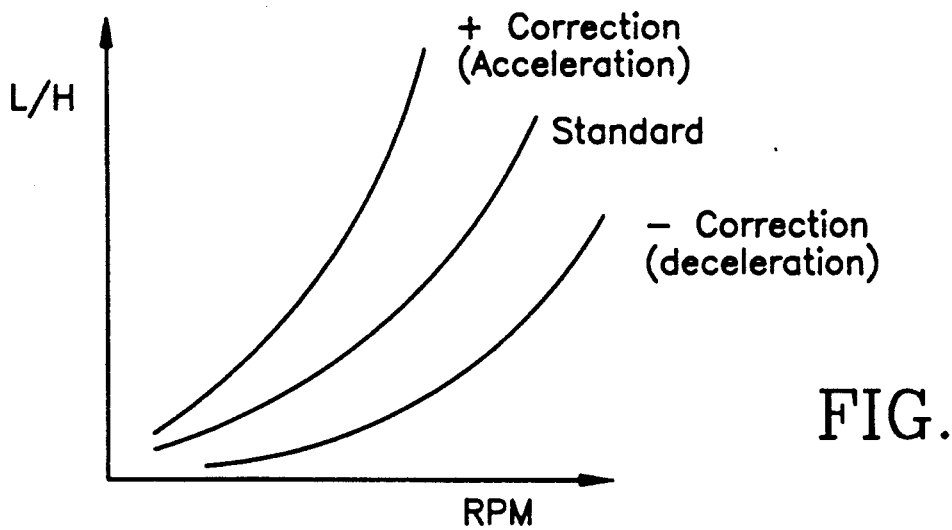
FIG. 5 is a graph depicting the amount of fuel-flow correction needed for acceleration and deceleration.

As shown in FIG. 5, a very sensitive alarm can be configured by detecting engine acceleration or deceleration and using this as a basis for correcting the upper limit value H and the lower limit value L. During acceleration, more fuel is required than when operating under constant conditions and, according to the preferred embodiment of the present invention, when acceleration is detected, the upper limit H is corrected toward a higher level during the time period of that acceleration only and returns to a lower value for H when constant operations are reached. This makes it possible to have a more sensitive alarm system.

Although described with respect to a preferred embodiment of the invention, it should be noted that various changes and/or modifications may be made without departing from the spirit of the invention. For instance, many types of fuel-flow detecting systems can be used so long as the fuel flow within the fuel line is detected, be it directly or indirectly. In addition, so long as the detection is for fuel within the fuel line 8, the site of the detection is not critical. Also in the preferred embodiment, the engine operating status was determined by detecting engine RPM by the ignition unit 11 as well as by detecting the throttle-angle. Either or both of these detecting units may be used without departing from the spirit of the invention. Instead of detecting the throttle angle with throttle-angle sensor 13, an air intake manifold pressure or an exhaust temperature could alternatively be sensed and used as a means of determining the operating state of the engine. In addition, the alarm is activated when either too much or too little fuel is flowing in the preferred embodiment, but it could be limited to activation upon detection of one or the other. Further in the disclosed embodiment, a carburetor was used as the fuel delivery device, but the invention is not limited to this means and a fuel injection valve could also be used. The fuel injection valve could be of the type that injects fuel directly into an ignition chamber or one which injects fuel into an air intake passage. Finally, ROM 33 was disclosed for storing the limit values, but other means could be used. It would be possible, for example, to use resistors and capacitors in an analog setting arrangement. In general, the present invention is only intended to be limited by the scope of the following claims.

I claim:

1. An engine fuel-flow alarm system comprising:
   an engine;
   means for supplying fuel to said engine, said fuel supplying means including a conduit;
   means for sensing the rate of fuel flowing within the conduit and outputting a rate signal corresponding to the sensed fuel flow rate;
   means for sensing an operational parameter of the engine and outputting an operational signal corresponding with the sensed operational parameter;
   control means for receiving said rate and operational signals and activating an alarm if the sensed fuel flow rate is outside of a permissible range, said control means including a setting means for ascertaining a permissible flow rate range defined by upper and lower fuel flow limit values in dependence upon said operational signal, comparator means for comparing said rate signal with said upper and lower fuel flow limit values and warning means for signalling when said rate signal is outside said permissible flow rate range.

2. The engine fuel-flow alarm system as claimed in claim 1, wherein said setting means includes storage means for retaining pre-set upper and lower fuel flow limit values and a compensation means for adjusting said pre-set upper and lower fuel flow limit values in dependence upon a predetermined engine variable, wherein said comparator means receives said upper and lower fuel flow limit values for comparison with said rate signal after said upper and lower fuel flow limit values are adjusted by said compensation means.

3. The engine fuel-flow alarm system as claimed in claim 2, further including means for sensing the acceleration state of said engine, said compensation means further adjusting said pre-set upper and lower fuel flow limit values in dependence upon the sensed acceleration state.

4. The engine fuel-flow alarm system as claimed in claim 1, wherein said engine operational parameter sensing means comprises a throttle angle sensor.

5. The engine fuel-flow alarm system as claimed in claim 1, wherein said engine operational parameter sensing means comprises an engine RPM sensor.

6. The engine fuel-flow alarm system as claimed in claim 1, wherein said warning means provides a direct indication that said rate signal is outside said permissible flow rate range.

7. The engine fuel-flow alarm system as claimed in claim 6, wherein said warning means comprises an audible buzzer.

8. The engine fuel-flow alarm system as claimed in claim 6, wherein said warning means comprises a lamp.

9. The engine fuel-flow alarm system as claimed in claim 1, wherein said warning means provides an indirect indication said rate signal is outside said permissible flow rate range.

10. The engine fuel-flow alarm system as claimed in claim 9, wherein said warning means comprises an ignition shut-off circuit.

11. An engine fuel flow alarm system comprising:
    an engine;
    means for supplying fuel to said engine, said fuel supplying means including a conduit;
    means for sensing the rate of fuel flowing within the conduit and outputting a rate signal corresponding to the sensed fuel flow rate;
    means for sensing an operational parameter of the engine and outputting an operational signal corresponding with the sensed operational parameter;
    control means for receiving said rate and operational signals and activating an alarm if the sensed fuel flow exceeds a permissible upper or lower limit value limit; said control means including storage means for retaining at least one pre-set upper or lower fuel flow limit value, a compensation means for adjusting said at least one pre-set fuel flow limit value in dependence upon said operational signal, comparator means for comparing said rate signal with said at least one pre-set upper or lower fuel flow limit value after said at least one pre-set upper or lower fuel flow limit value is adjusted by said compensation means and warning means for signalling when said rate signal exceeds said at least one adjusted pre-set upper or lower fuel flow limit value.

12. The engine fuel-flow alarm system as claimed in claim 11, further including means for sensing the acceleration state of said engine, said compensation means further adjusting said pre-set upper and lower fuel flow limit values in dependence upon the sensed acceleration state.

13. The engine fuel-flow alarm system as claimed in claim 11, wherein said engine operational parameter sensing means comprise a throttle angle sensor.

14. The engine fuel-flow alarm system as claimed in claim 11, wherein said engine operational parameter sensing means comprises an engine RPM sensor.

15. The engine fuel-flow alarm system as claimed in claim 11, wherein said warning means provides a direct indication that said rate signal exceeds said permissible upper or lower limit value.

16. The engine fuel flow alarm system as claimed in claim 15, wherein said warning means comprises an audible buzzer.

17. The engine fuel-flow alarm system as claimed in claim 15, wherein said warning means comprises a lamp.

18. The engine fuel-flow alarm system as claimed in claim 11, wherein said warning means provides an indirect indication said rate signal exceeds said permissible upper or lower limit value.

19. The engine fuel-flow alarm system as claimed in claim 18, wherein said warning means comprises an ignition shut-off circuit.

20. A method of indicating when the rate of fuel flowing through a conduit to an engine is outside a permissible range comprising:
    sensing an engine operational parameter;
    adjusting pre-set upper and lower fuel flow limit values in dependence upon the sensed engine operational parameter to obtain adjusted upper and lower fuel flow limit values;
    sensing the fuel rate of flow;
    comparing the sensed flow rate of fuel with the adjusted upper and lower limit values; and
    activating a warning system when the sensed flow rate of fuel is either above the adjusted upper limit value or below the adjusted lower limit value.

* * * * *